United States Patent [19]

Brown

[11] Patent Number: 4,628,504
[45] Date of Patent: Dec. 9, 1986

[54] DISTRIBUTED BUS CONTROL COMMUNICATION PROTOCOL

[75] Inventor: Jeffrey R. Brown, Chicago, Ill.

[73] Assignee: Honeywell Inc., Minneapolis, Minn.

[21] Appl. No.: 462,263

[22] Filed: Jan. 31, 1983

[51] Int. Cl.$^4$ .............................................. H04J 3/02
[52] U.S. Cl. ..................................................... 370/85
[58] Field of Search .................. 370/85, 94, 94 U, 89, 370/86; 340/825.03, 825.08, 852.52

[56] References Cited

U.S. PATENT DOCUMENTS

| | | | |
|---|---|---|---|
| 3,587,044 | 6/1971 | Jenkins | 370/94 U |
| 4,281,380 | 7/1981 | Demesa, III et al. | 370/94 U |
| 4,332,027 | 5/1982 | Malcolm et al. | 370/94 U |
| 4,342,995 | 8/1982 | Shima | 370/94 U |
| 4,352,183 | 9/1982 | Davis et al. | 370/94 U |
| 4,445,214 | 4/1984 | Reynolds et al. | 370/85 |
| 4,584,679 | 4/1986 | Livingston et al. | 370/85 |

*Primary Examiner*—Douglas W. Olms
*Assistant Examiner*—Frank M. Scutch, III
*Attorney, Agent, or Firm*—Trevor B. Joike

[57] ABSTRACT

In a variable time division distributed bus control system for determining the order in which a plurality of stations can communicate messages over a common communication channel, the system includes a communication channel for transmitting information between a plurality of stations, each station having a time slot memory for storing at least one address identifiable as a time slot during which an assigned station can transmit information over the communication channel, each time slot having only one station assigned thereto, and a transmission controller responsive to the messages being transmitted over the communication channel and responsive to the time slot memory for transmitting messages over the communication channel when it is the turn of each station to transmit. The station can include an initializing arrangement responsive when the communication channel has been quiet for a predetermined time period for initiating the transmission of an initializing message over the communication channel, the initializing message having an acknowledger portion requiring a specified station to acknowledge the initializing message, the predetermined time period being different for each station connected to the communication channel. The station may also include an acknowledgement timer arrangement for delaying the transmission of any further messages for a predetermined period of time after the transmission of a global message requiring acknowledgement unless the selected station has acknowledged the global message. The station may also include a mechanism for allowing the station to transmit more than one message during a specified time slot.

24 Claims, 24 Drawing Figures

DISTRIBUTED BUS CONTROL COMMUNICATION PROTOCOL

BACKGROUND OF THE INVENTION

The present invention relates generally to systems which provide variable time division communication between stations connected to a common communication channel and, more specifically, to such systems which provide for immediate acknowledgement of global messages (i.e. messages for communication to all stations connected to the communication channel), to such systems wherein each station on the bus can initialize the system after the system has been quiet beyond a predetermined amount of time, and to such systems which are capable of transmitting multiple messages.

Information communication systems have been used in a wide variety of applications. For example, one important application is in the control and supervision of building functions such as energy management, fire and security, and access control. Any one or all of these building control and supervision functions can be performed by the system installed within the building.

In the energy management area, the system is designed to monitor various status points such as temperature sensors, flow rate sensors, and humidity sensors and to control various command points such as dampers, fans, and the control points of local loop controllers.

Such systems typically comprise a plurality of stations connected to a common communication channel and supervised by a processor. Multiple processors may be connected to another common communication channel so that they can share supervisory and control duties. Such processors can themselves be considered stations but of a higher level than the stations which interface directly with the points being supervised and controlled. If the system is large enough, the processors themselves can be connected to other processors to help share the control and supervisory duties.

If these multiple processing stations are to share control and supervisory duties, it is apparent that they must communicate with one another. In order to provide for an orderly communication system so that more than one station does not try to communicate on the bus at the same time resulting in garbled messages, a communication protocol must be provided. This communication protocol can be as simple as a polling system wherein a central processor establishes direct communication with the various stations connected to the communication channel by polling and commanding the station individually, or the protocol may be more complicated as in the case of a time division multiplexing system in which all of the stations have a specific time slot within which they can transmit messages over the communication channel with no time slot being assigned to more than one station.

Time division multiplexing, where the time division is of fixed or variable duration, is not a new concept. Moreover, prior art systems using time division multiplexing have had provision for the transmission of global messages to stations on the common communication channel. A global message is a message which all stations on the communication channel might find useful or necessary. Even though all stations on the communication channel can find the global messages useful, such global messages usually require a specified station to acknowledge the correct receipt of the global message. The specified station in these prior systems provided such acknowledgement only in its own time slot. However, one of the problems with this kind of system is that the station which transmitted the global message had to wait for the acknowledger's time slot to find out whether it correctly transmitted the global message.

In a time division multiplexing system, and initializing sequence must be provided in the event that the communication channel has been quiet beyond a predetermined amount of time. For example, if a station fails to transmit during its time slot and the other stations on the communication channel resynchronize themselves to the station which is presently transmitting, the communication channel may become permenently quiet unless an initializing sequence is performed. In prior art systems, the initialization of a quiet bus was typically performed by a designated station. In such a system, if the initializer station is the station which failed, the bus can become permanently quiet.

Additionally, prior art time division multiplexing systems were limited to the transmission of one message during the time slot.

SUMMARY OF THE INVENTION

In order to avoid the problems associated with delaying the acknowledgements of global messages until the acknowledger's time slot has occurred, the present invention provides for the immediate acknowledgement by the acknowledger of global messages which require acknowledgement. Thus, the variable time division distributed bus control system of the present invention determines the order in which a plurality of stations can communicate messages over a common communication channel, the messages including at least global messages requiring acknowledgement by stations specified in the initializing messages and end-of-transmission messages to inform the stations in the communication system that the transmitting station has ended transmission, the system being arranged to support the immediate acknowledgement of the global messages by the specified station. The system includes a communication medium for supporting the communication of information between a plurality of stations wherein each station has at least one time slot during which it can transmit information over the communication medium, a transmission controller for determining when the time slot of the station has occurred, and an acknowledgement timer for delaying the transmission of any further messages for a predetermined period of time after the transmission of a global message requiring acknowledgement unless the selected station has acknowledged the global message.

Instead of designating one station to be the initializer station, the present invention allows every station in the system to be an initializer station. Also, instead of designating one station to be the acknowledger station, the present invention allows any station in the system to be an acknowledger station. Thus, the variable time division distributed bus control system which determines the order in which a plurality of stations can communicate messages over a common communication channel includes a communication medium for supporting the communication of information between a plurality of stations wherein each station includes at least one time slot during which information can be transmitted by the station, a transmission controller for transmitting messages during the appropriate time slot, and an initializer responsive when the communication medium has been quiet for a predetermined time period in order to initiate the transmission of an initializing message over the communication medium, the initializing message having an acknowledger portion requiring a specified station to acknowledge the initializing message, and wherein each station has a different predetermined time period set into it so that no two stations will attempt to initialize the communication system at the same time.

Moreover, the present invention allows more than one message to be transmitted during the time slot if the station which is transmitting the messages during its time slot does not give up the communication channel until it transmits another transmission message.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
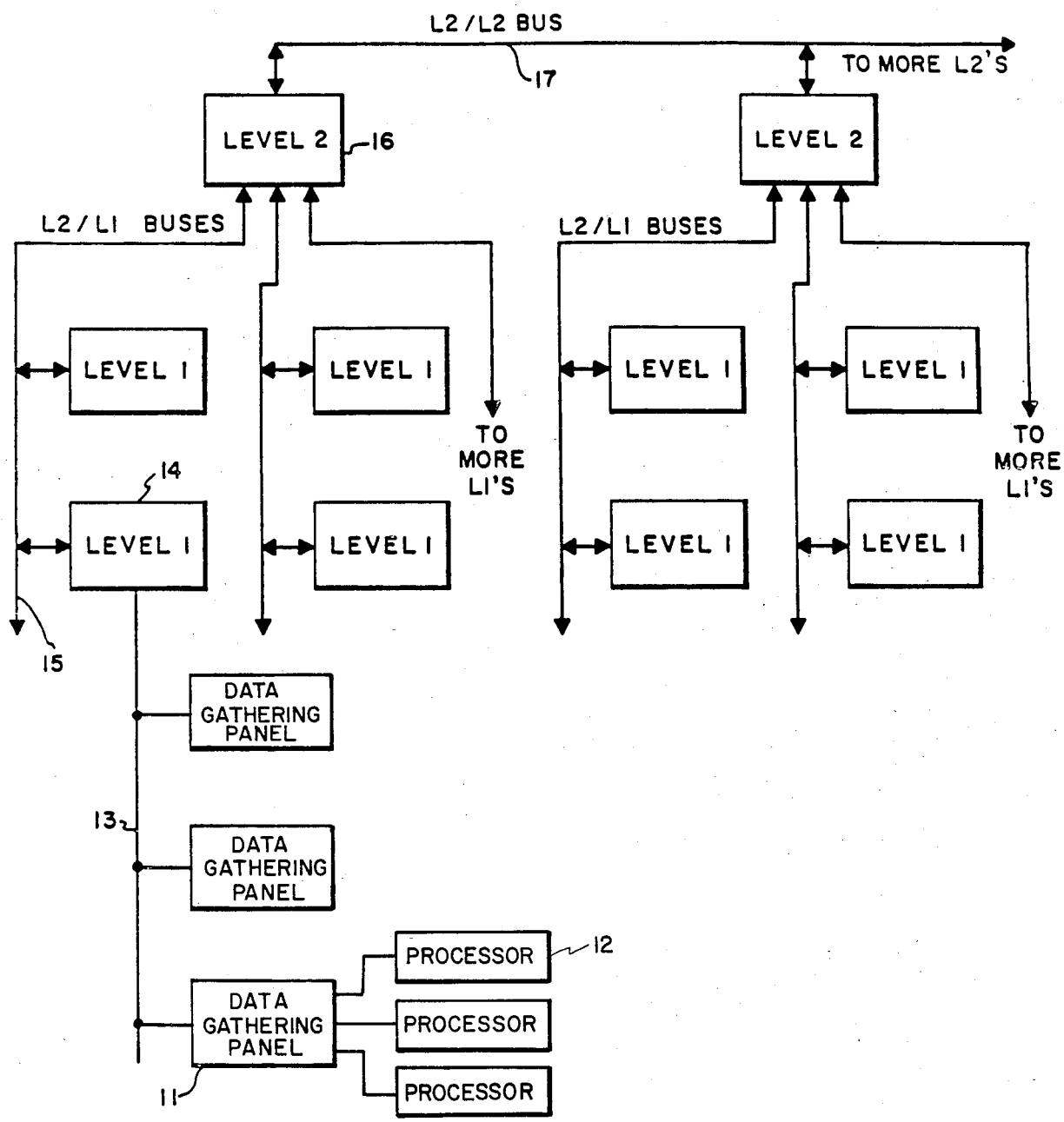
FIG. 1 is a generalized block diagram of a system in which the present distributed bus control can be incorporated.

Although the present distributed bus control protocol system can be used in many existing systems, it is particularly suited for the system such as shown in FIG. 1. Data gathering panels (which may be referred to as level 0 processors) such as data gathering panel 11 shown in FIG. 1 is the main interface between the system processors and the various points 12 which can be supervisory points such as temperature sensors, door switches or the like or command points such as fans, alarms or the like. Plural data gathering panels 11 can be connected to a common bus 13 to a Level 1 processor 14 which provides the overall supervisory function for data gathering panels 11. In an energy management system, for example, the Level 1 processor 14 can include the energy management routines which are being performed on the various command points controlled by the system. Data gathering panels 11 themselves may have processors therein for converting the information derived from sensors 12 to the appropriate form for transmission to processor 14 over communication channel 13 or for accepting commands from processor 14 over communication channel 13 and properly processing the commands so that they can be utilized by other points 12 which may be command points.

In order to provide a system which is flexible, data gathering panels 11 should be able to supervise and control a limited number of points and processor 14 should be able to control and supervise a limited number of data gathering panels 11. The system as shown has provisions for interconnecting plural Level 1 processors 14 over communication bus 15 so that the processors 14 can share information. Moreover, the system as shown has the added flexibility that the communication channel 15 can be under supervision of a Level 2 processor 16 and plural Level 2 processors 16 can communicate with one another over a common communication channel 17.

Figure 2:
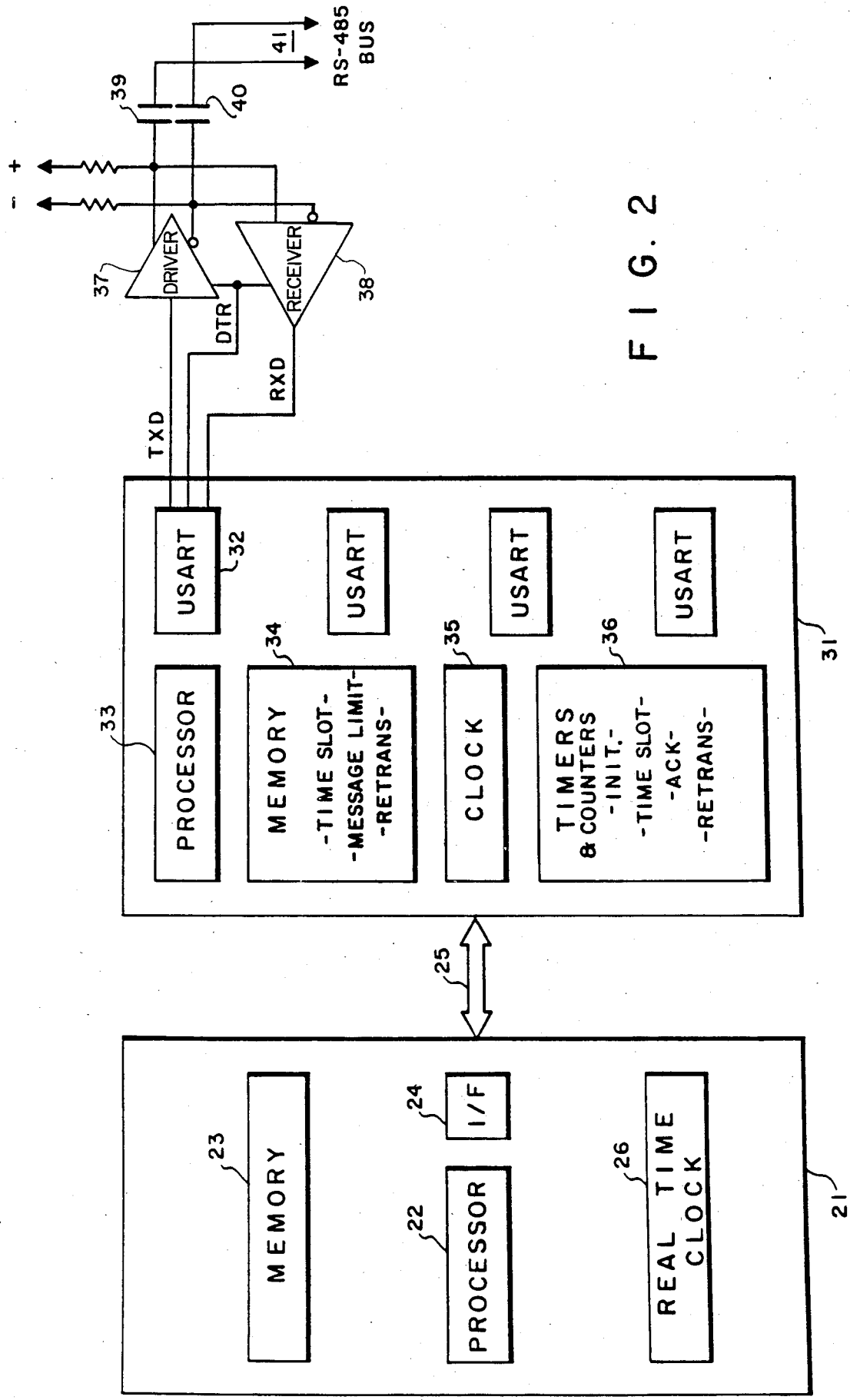
FIG. 2 shows the details of any one of the processors shown in FIG. 1.

Any of the processors 14 or 16 shown in FIG. 1 can take the form shown in FIG. 2. In FIG. 2, processor block 21 includes a processor 22 which may be a Motorola 68000, for example, wherein processor block 21 also includes memory 23 for processor 22, interface ports 24 for interfacing processor 22 to data, address and control lines 25, and real time clock 26. Connected to processor block 21 is transmission or communication control 31 which has thereon the universal synchronous-asynchronous receiver transmitters 32 for converting the data to appropriate transmission levels for transmission over the bus, for transmitting and receiving that information, for employing cyclic redundancy checkers and generators (CRC) to insure that messages received are valid messages, and for encoding/decoding data. Manchester encoding can be used by transceivers 32 and is the representation of each bit in a data stream with two actual bits at twice the original transmission rate. Thus, a 0 bit is encoded as a 0-bit/1-bit combination and a 1-bit is encoded as a 1-bit/0-bit combination. The use of Manchester encoding eliminates the DC components of the transmissions, provides clock recovery, allows the use of a simple capacitor coupling and, perhaps most importantly, provides data transparency. Communication circuit 31 also includes processor 33 which controls the transmission and reception of data over the bus and performs the protocol function according to the present invention. Communication circuit 31 also includes memory 34 for processor 33, clock 35 (not a real time clock) for providing all the timing functions involved in the communication circuit 31. Circuit 31 further includes various timers and counters 36. These timing and counting functions include the initialization timer, the time slot counter, the acknowledgement timer, the retransmission counter, and various other timers and counters all of which will be described hereinafter. These timers and counters can be either hardware timers driven by clock 35, software timers driven by clock 35, hardware or software counters not driven by clock 35, or a combination of these different types of timers and counters.

Memory 34 has provision for storing the time slot during which the station can transmit information. No two stations can be assigned to the same time slot although a station may have more than one time slot during which it can transmit. Memory 34 also stores the message limit which is the number of messages possible that the station can transmit during a single time slot and a retransmission limit which is the number of times that a station an attempt retransmission of data before it gives up. As shown, communication circuit 31 can support four universal synchronous/asynchronous receiver transmitters and can thus be connected to four buses. Each receiver transmitter is connected through line drivers and receivers 37 and 38 (e.g. RS485 transceivers), device 37 being the output bus driver for transmitting data over line TXD through DC blocking capacitors 39 and 40 to the bus 41. Incoming information is supplied through receiver 38 over the RXD line to the receiver transmitter. Devices 37 and 38 are under control of a receive-transmit signal line DTR which can control which transceiver is active.

Figure 3A:
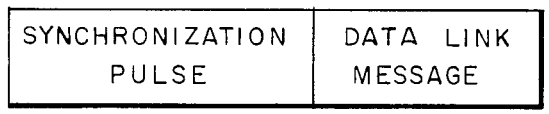
FIGS. 3-6 show the messages which can be transmitted over the communication system shown in FIG. 1.
Figure 3B:

The message which is transmitted by the stations in the present protocol system takes the form of either FIG. 3A or FIG. 3B depending upon whether the system is operating for synchronous transmission or for asynchronous transmission. For synchronous transmission, the message as shown in FIG. 3A is comprised of two portions, the synchronization pulse and the data link message. On an RS-485 bus, the synchronization pulse can be, for example, a Manchester synchronization pulse. Such a pulse may be an 11-bit pulse which is composed of eight Manchester 0-bits followed by a 3-bit wide pulse with the first $1\frac{1}{2}$ bits high and the next $1\frac{1}{2}$ bits low. If Manchester enclding is not used and where transmission is synchronous, the synchronization pulse may be an 8-bit code, for example, 01101001. Such a synchronization pulse provides bit and character synchronization. Where the transmission is asynchronous, there is no synchronization pulse required and bit synchronization is provided for each character with a start and stop bit. Since no synchronization pulse is needed, the message can take the form of simply a data link message as shown in FIG. 3B.

Figure 4A:
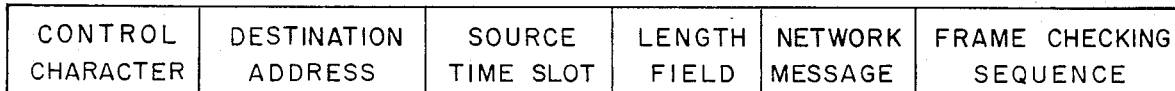
Figure 4B:
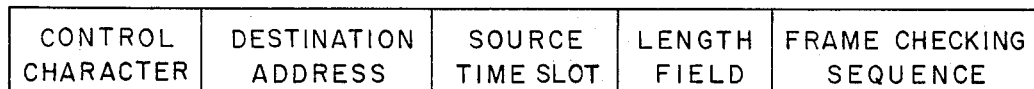
Figure 4C:

The data link message shown in FIGS. 3A and 3B can take any of the forms shown in FIG. 4A, FIG. 4B or FIG. 4C.

As shown in FIG. 4A, the first portion of this type of data link message is a control character which describes the type of message being transmitted. As an example, there may be four basic types of messages which can be useful to transmit. For example, the control character can indicate a start of message of which there may be three. "Start of message-direct" which precedes a direct point-to-point message, "start of message-non-critical global" which precedes a global message which need not be acknowledged, and a "start of message-critical global" which precedes a global message which must be acknowledged. As pointed out above, a global message is one which is applicable to all stations in the system. The other control characters can include end-of-transmission.

As shown in FIG. 4C, the control character is the only portion of the data link message (unless it is one of the start of message codes in which case the remaining portions are present). Thus, an end-of-transmission message, an acknowledgement message and a negative acknowledgement message would only have the control character therein. For all messages wherein the control character contains a start of message control character, the message will take the form of FIGS. 4A or 4B.

The next character in the message is the destination address which identifies the physical address (time slot) of the station that is to receive the message. Special bit patterns are reserved for global messages.

The next character in the message is the source time slot. The present protocol is a variable time division multiplexing protocol. The source time slot contains the value of the source (sending) station's time slot for system synchronization purposes. Thus, a station's address is really the time slot during which it can transmit. A station may be assigned to more than one time slot. Each station, as will be explained hereinafter, will compare the value in the source time slot portion of a message on the communication channel to the value of its own time slot counter. If there is disagreement, then the receiving station must resynchronize.

The length field character gives the length of the network message field. There may or may not be a network message as will be described hereinafter. This field can be used for testing for length mismatch.

The network message portion of the message may or may not be present in the data link message. The network message portion will be described in relation to FIGS. 5A and 5B hereinafter.

The last portion of the message which is transmitted is a frame checking sequence and contains a predetermined number of bits used in cyclic redundancy checking. Thus, this frame contains a cyclic redundancy polynomial accumulated on the entire data link message. It is used to verify that the message is received free of errors. All bytes of the message, from the control character to the last byte of the network message field, are included in the accumulation of the polynomial. The frame checking sequence is generated prior to Manchester encoding and it is checked after Manchester decoding. The frame checking sequence can be gnerated and verified by hardware or software.

Figure 5A:
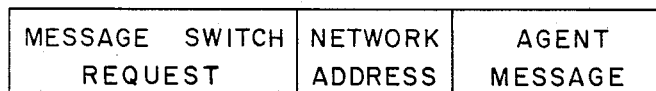
Figure 5B:

As shown, the network message field shown in FIG. 4A can take the form of either FIG. 5A or FIG. 5B.

As shown in FIG. 1, it may not be possible for all of the Level 1 processors to share a common bus because of hardware constraints of a number of Level 1's that can be attached to one bus and a number of DGPs which can be supported by one Level 1 processor or because of geographical separation of the processors. Thus, there is a requirement to support multiple Level 1 buses terminating at a Level 2 processor. Similarly, a very large installation may require multiple Level 2 processors. As with Level 1 processors, portions of the installation supported by each Level 2 can be divided functionally (application oriented) or geographically (area oriented). These Level 2 processors are permitted to communicate with one another over a Level 2 bus.

In a multiple bus system it may be required that stations send messages to other stations that are not connected to the same bus. To do this requires network switching of multibus messages. Thus, the network message prefix is used for designating another network or system to which the message is directed. If the message is not to be switched to another network, then the network message contains only the agent message shown in FIG. 5B and to be described hereinafter. If on the other hand the message must be retransmitted on another bus, the network message prefix, as shown in FIG. 5A, contains both a message switch request and a network address. The message switch request is a unique code which indicates to the system that the message is to be switched to a different network, the different network being specified in the network address portion. Thus, the network address is a code that uniquely identifies the station or stations to which the agent message is to be sent. Global messages have a special code indicating that the agent message is to be sent to all stations on a particular network or to all stations on all networks.

Figure 6A:
Figure 6B:
Figure 6C:

In essence, the agent message contains the information which is to be transmitted from one station to another or from one station to all stations. As shown in FIGS. 6A-6C, the agent message can take various forms depending upon the type and amount of information to be transmitting. FIG. 6A shows an agent message for transmitting application program data in an amount not requiring plural messages. This message contains a message priority which prioritizes the importance of the information being transmitted, a message ID which indicates to which application program the data is to be passed, and the application program data sent to the designated application program.

If the application program data for a message exceeds the number of bytes provided in the application program data field, then the data must be separated or split into multiple packets for separate transmission. Thus, the information is transmitted in an agent message form such as that shown in FIG. 6B where the packet indicator portion indicates that the message contains a packet of information rather than the complete information, a packet ID portion so that the receiver knows that all of the packet messages as shown in FIG. 6B relate to the same message which is being transmitted, a packet number portion which gives the sequential number of the particular packet which is being transmitted at the time, packet flags which contain status information for the messages that have been dissembled into packets (such as, for example, last packet of message) and the remaining character fields shown in FIG. 6A.

If the message is being network switched and acknowledgement is required by the sender, an end-to-end acknowledgement request prefix is added to the agent message. This prefix requires that the end which receives the message must acknowledge through the intermediate switching stations to the end which transmitted the message. Thus, as shown in FIG. 6C, the end-to-end prefix includes an end-to-end acknowledgement request which requests an end-to-end acknowledgement and an acknowledgement ID portion to identify the message and associate it with the correct acknowledgement message.

Each station contains a time slot counter, a message counter, and one or more addresses or time slots as well as other counters and timers. The time slot counter keeps track of the current time slot which is also a representation of which station's turn it is to transmit. When the value of the time slot counter equals one of the station's addresses, then it is that station's turn to transmit. When the value of the time slot counter does not match any of the station's addresses, then the station monitors the communications bus for messages addressed to it (that is, for messages in which the destination address character contains one of the station's addresses or the global address). Whenever a station receives or transmits an end-of-transmission (EOT) control character, it increments its time slot counter in order to pass along the right to transmit to the next station. If, upon incrementing its time slot counter, the contents is greater than the address of the station on the communication bus which is assigned the highest address, then the station resets its time slot counter to one.

Associated with each address, i.e. each station, can be a message limit and a priority threshold. The message limit specifies the maximum number of messages that a station may transmit when the value of its time slot counter equals the address with which the message limit is associated. Each station may have a different message limit and each time slot associated with each station may also have a different message limit. The number of messages sent during a time slot is maintained in the station's message counter. Messages are transmitted in priority order. The priority threshold specifies the minimum priority a message must have to be transmitted as a non-initial message. The first message which has the highest priority of the messages outstanding is transmitted regardless of the relation between its priority and the priority threshold. After a station has transmitted all its high priority messages outstanding, or reached its message limit of the number of messages that can be transmitted, it transmits and end-of-transmission control character. This passes the right of transmission to the next station.

Also associated with each address of a station is a retransmission limit. Normally, when a transmitted message is negatively acknowledged or not acknowledged at all it is retransmitted. The retransmission limit specifies the maximum number of times that retransmission can be done before the transmitting station passes on the right to transmit.

If a station detects that the bus has been quiet for a certain length of time, it reinitializes communications on the bus. This amount of time, called the quiet bus time, is different for each station so that no two or more stations attempt initialization at the same time. The initializing station is designated the initializer. It formats an initialization message and transmits it globally. The initialization message contains the address of a station other than initializer. This other station acknowledges the global initialization message and becomes the designated acknowledger. When the bus is initialized, all operational stations on the bus synchronize themselves to the initializer and normal communications resumes. The initializer reinitializes the bus at the current value of its time slot counter so that no station will be skipped.

When a station receives a direct message addressed to it, it immediately acknowledges the message with an acknowledgement direct (ACK-D), or negatively acknowledges it with a negative acknowledgement (NAK) if errors are detected. For a critical global message (addressed with all stations), any station will respond with a negative acknowledgement if it detects errors, but only one station, designated the acknowledger, will respond with a positive acknowledgement. The positive acknowledgement to a critical global message is actually a double acknowledgement. The acknowledger transmits a global acknowledgement (ACK-G), delays an amount of time, and then transmits a direct acknowledgement (ACK-D). This double acknowledgement pattern is used to make certain that no station has missed the critical global message. If a station which is not the acknowledger does not receive the critical global message, then the occurrence of the global acknowledgement message makes this failure known. The station which missed the global message then transmits a NAK, which either is received by the source station or which collides with the acknowledger ACK-D. As a result, the source station is made aware of the need to retransmit. Non-critical global messages are not acknowledged (either positively or negatively) since the information they contain is not important enough the warrant retransmission.

Figure 7:
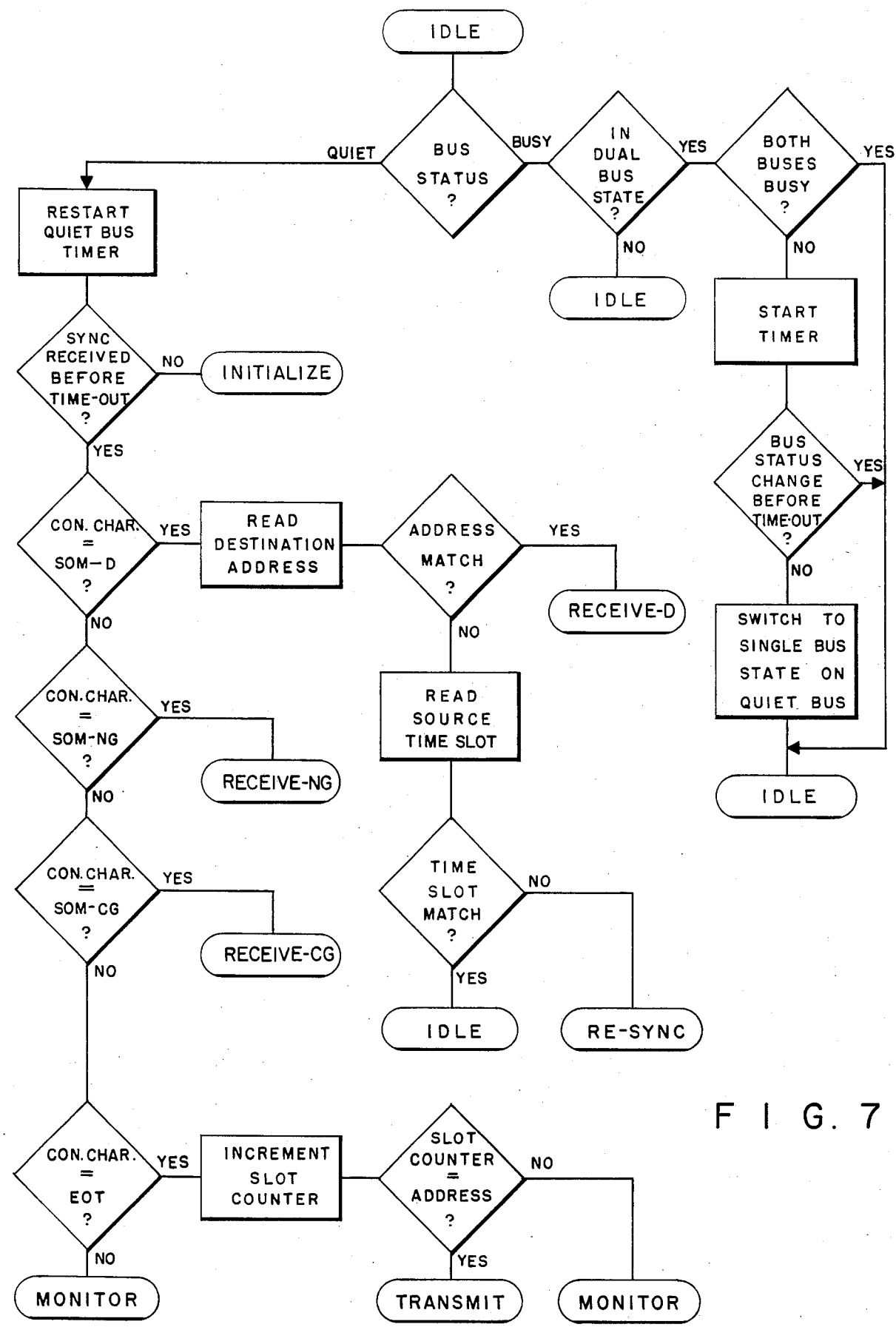
FIG. 7 shows a flow chart of the distributed bus control wherein the stations in the communication system are at idle.

The detailed description of the operation will now be provided. The idle state, as shown in FIG. 7, is the state in which the station will be when it is ignoring communications on the bus. Stations ignore direct messages not addressed to them. The idle state is also the state in which the protocol is initialized, that is, when the station is powered on. Upon power on or reset, the value of the time slot counter is initialized at one. Each station will transmit a power failure reset message during its first time slot after power return or reset, unless its first transmission is an initialization message. In that case, the first transmission following the initialization message will be a power failure reset message.

As shown in FIG. 7, if the station is in the normal (dual bus) state in a redundant bus configuration and the station does not receive a sync pulse on either bus, and one bus remains busy and the other bus remains quiet so that the station cannot enter the initialization state, then, if this condition exists for a certain amount of time without change of the status of either bus, the station will switch itself to the single bus state on the quiet bus and return to the beginning of the idle state. This test only applies to systems which use redundant buses. If both buses are busy or if the single bus in a single bus configuration is busy, the system returns to the beginning of the idle state.

When the bus becomes quiet, the station starts a timer and waits for the reception of a sync pulse. If the timer times out before the reception of a sync pulse, then the station enters the initialization state to be described hereinafter. The value loaded into the timer is a linear function of the station's lowest address. Since no two stations contain the same address no two stations will be in contention in attempting to initialize the bus.

However, if the bus is quiet and the sync pulse is received before the timer times out, then the timer is stopped and the station reads the first character of the message which is the control character. If the control character is a start of message for a direct message (SOM-D), the station reads the next character of the message, which is the destination address. If the destination address of the message matches one of the station's addresses, then the station enters the receive state (RECEIVE D-FIG. 9A) to be described hereinafter. If there is no address match, then the station reads the next character of the message which is the source time slot. If the source time slot does not equal the station's slot counter, then the station is out of synchronization. Thus, all stations should have the current time slot in their time slot counter. If an error has occurred in one of the stations such that its time slot counter does not match the time slot of the received message, a resynchronization operation is performed, which operation will be described with respect to FIG. 10. In any event, if the message is a direct message not addressed to this station and the station is synchronized, then the station returns to the beginning of the idle state and ignores the communications on the bus until the reception of the next sync pulse.

Figure 9A:
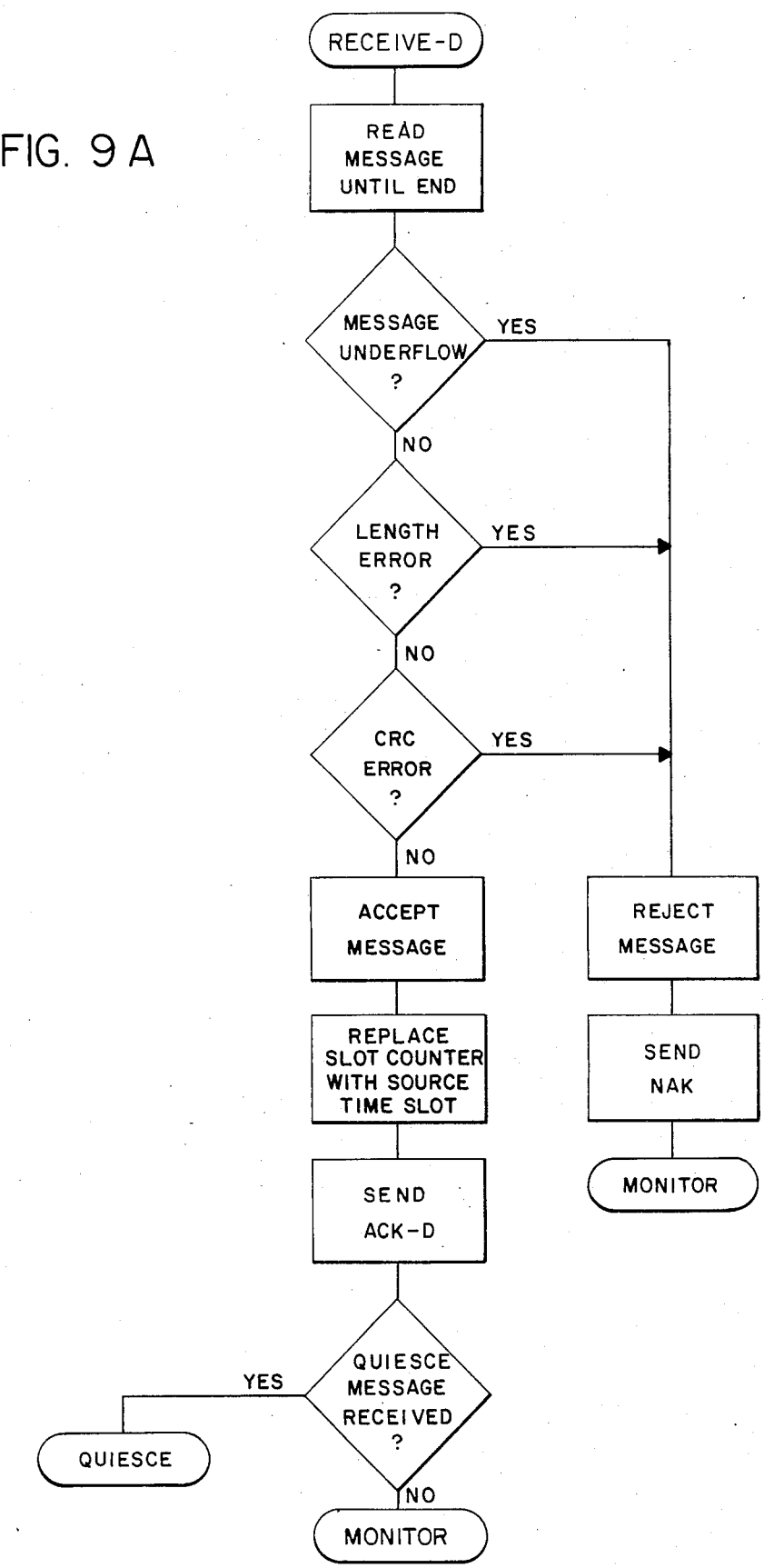
FIGS. 9A-9C show a flow chart depicting the operation of a station while it is receiving messages.
Figure 9B:
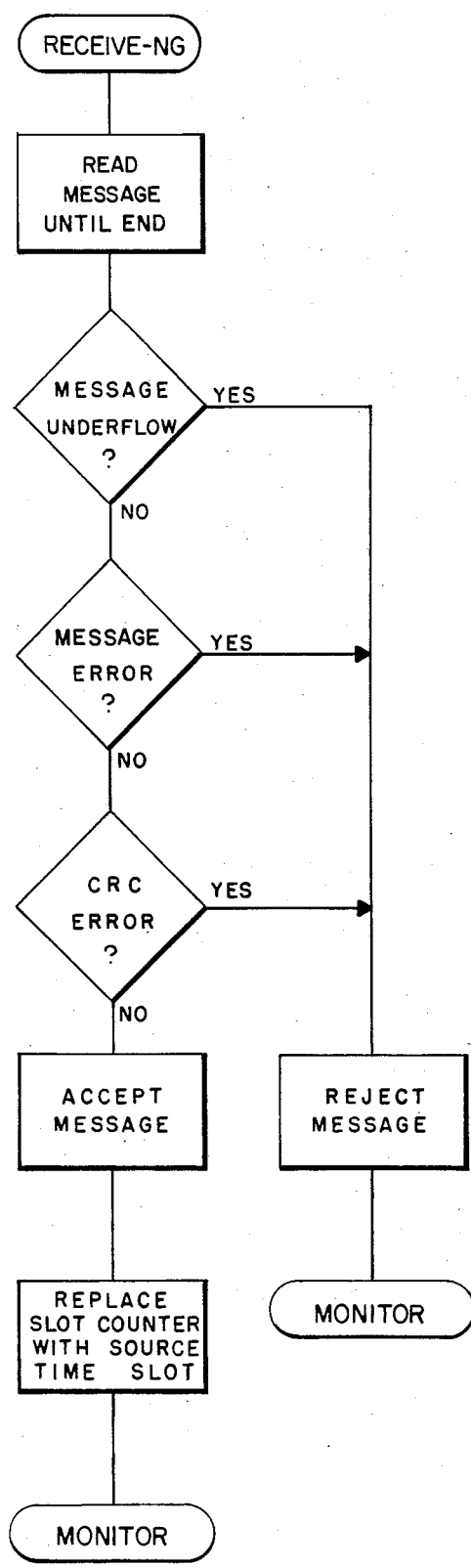
Figure 9C:
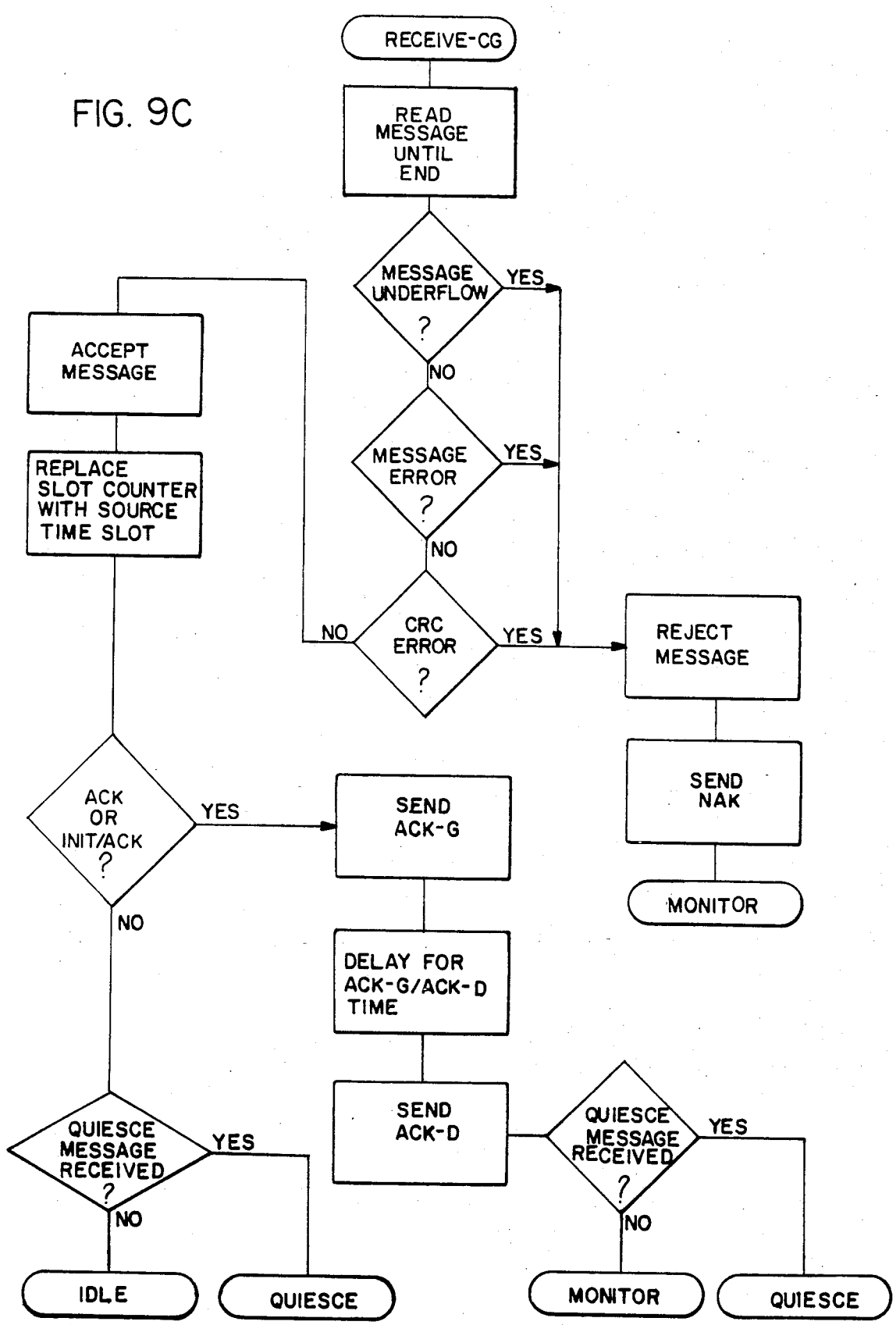

If the control character is not a start of message for a direct message but is a start of message for a non-critical global message (SOM-NG), the system enters the receive mode RECEIVE-NG (FIG. 9B). If the control character is neither a start of message—direct (SOM-D) nor a start of message - non-critical global (SOM-NG) but is a start of message critical global (SOM-CG), the system then also enters the receive mode RECEIVE-CG (FIG. 9C). If the control character is not a start of message character but is an end-of-transmission character, the station increments its time slot counter. If, after the time slot counter is incremented, the time slot counter equals one of the station's addresses, the station enters the transmit state. If there is no address match, the station enters the monitor state.

If the control character is not a start of message or end-of-transmission character the station enters the monitor state.

Figure 8:
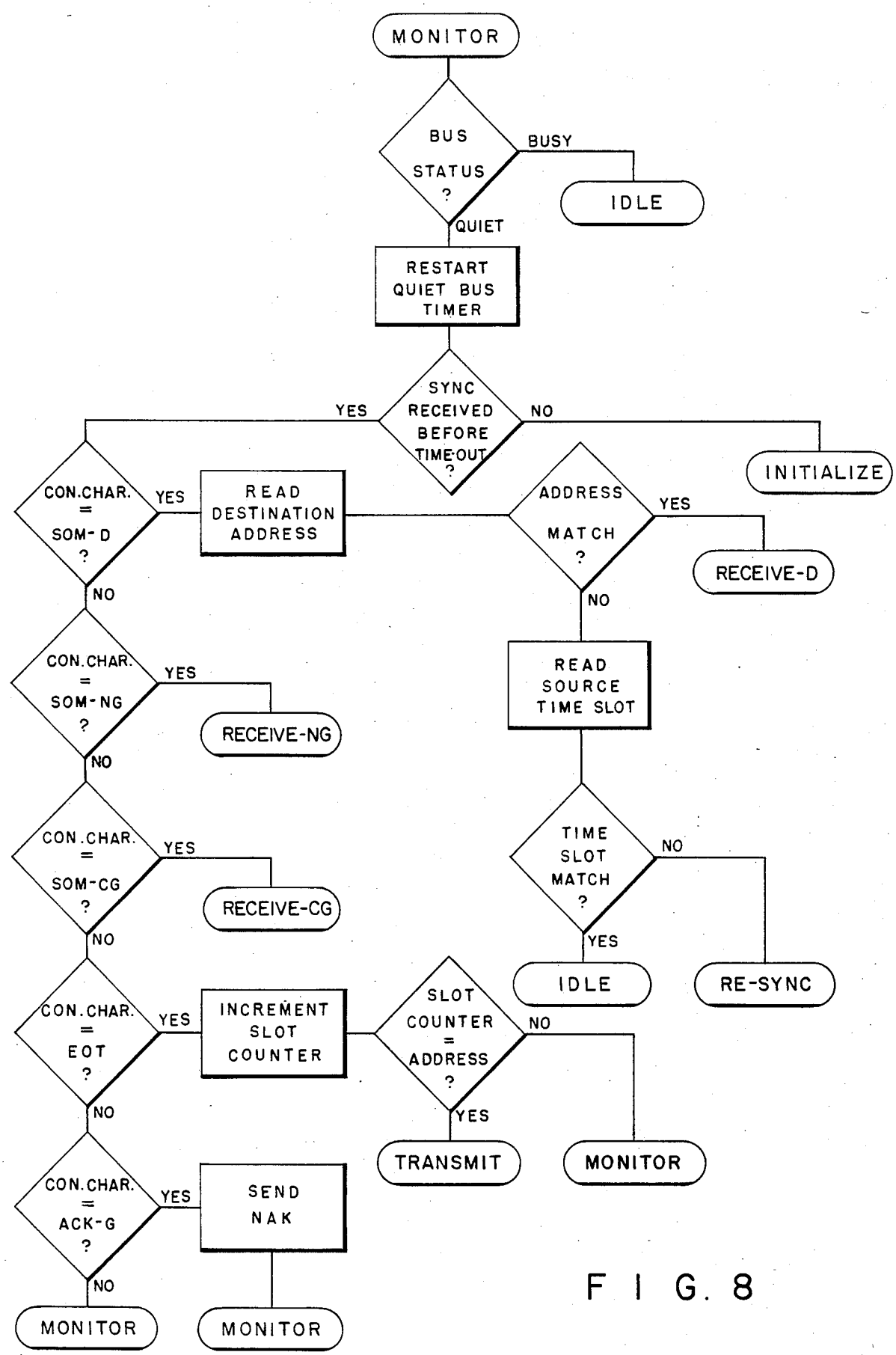
FIG. 8 shows a flow chart of the distributed bus control wherein the stations are in a monitoring condition monitoring the traffic on the communication channel.

The monitor state is shown in FIG. 8 and is the state in which the station will be when it is expecting the next message to start. As a comparison of FIGS. 7 and 8 will show, the monitor state is different from the idle state in two respects. If the bus is busy when the station enters this state, the station enters the idle state. If the bus is not busy when the station enters this state, the station starts a quiet bus timer and waits for the reception of the sync pulse. If the station receives a global acknowledgement (ACK-G) in this state it responds with a negative acknowledgement (NAK) and returns to the beginning of the monitor state. This operation is performed so that if a station misses the sync pulse of a critical global message, and hence misses the message itself, it will recover when it detects the ACK-G control character of the acknowledgement to the critical global message by transmitting a negative acknowledgement (NAK), which will cause the critical global message to be retransmitted.

The receive state flow is shown in FIGS. 9A-9C. In the receive states RECEIVE-D, RECEIVE-NG or RECEIVE-CG, the station receives the entire message (the end of message is indicated by loss of the Manchester clock on a global bus or a loss of carrier on another type of link). In both the RECEIVE-D and RECEIVE-CG modes, if the message length is less than the minimum length, or the length of the message does not agree with the value in the length field or there is a CRC (cyclic redundancy checking) error, then the message is rejected and a negative acknowledgement (NAK) is transmitted before the system returns to the monitor state. If the message had not been a direct or critical global message, no negative acknowledgement is sent and the system directly returns to the monitor state (FIG. 9B).

If the message had been received without error, the message is accepted. Whenever a message is accepted, the value of the station's slot counter is replaced with the contents of the message's source time slot character. This operation maintains the synchronization of the bus. The response of the station to an accepted message depends on the message type. For a direct message, the station responds with a direct acknowledgement (ACK-D) and returns to the monitor state or, if a quiesce message was received, transfers to the quiesce state. For a non-critical global message (FIG. 9B), the station does not respond but returns to the monitor state directly. For a critical global message (FIG. 9C) there are two possibilities. If the station is the acknowledger or if it is the initializer and the message was sent by the acknowledger, then the station sends a global acknowledgement (ACK-G), delays for the value of the ACK-G/ACK-D transmit delay constant, sends a direct acknowledgement (ACK-D), and returns to the monitor state or, if a quiesce message was received, transfers to the quiesce state. If the station is not the acknowledger or the initializer, or if it is the initializer but the message was not sent by the acknowledger, then the station does not respond but returns to the idle state, or if a quiesce message was received, transfers to the quiesce state.

Figure 10:
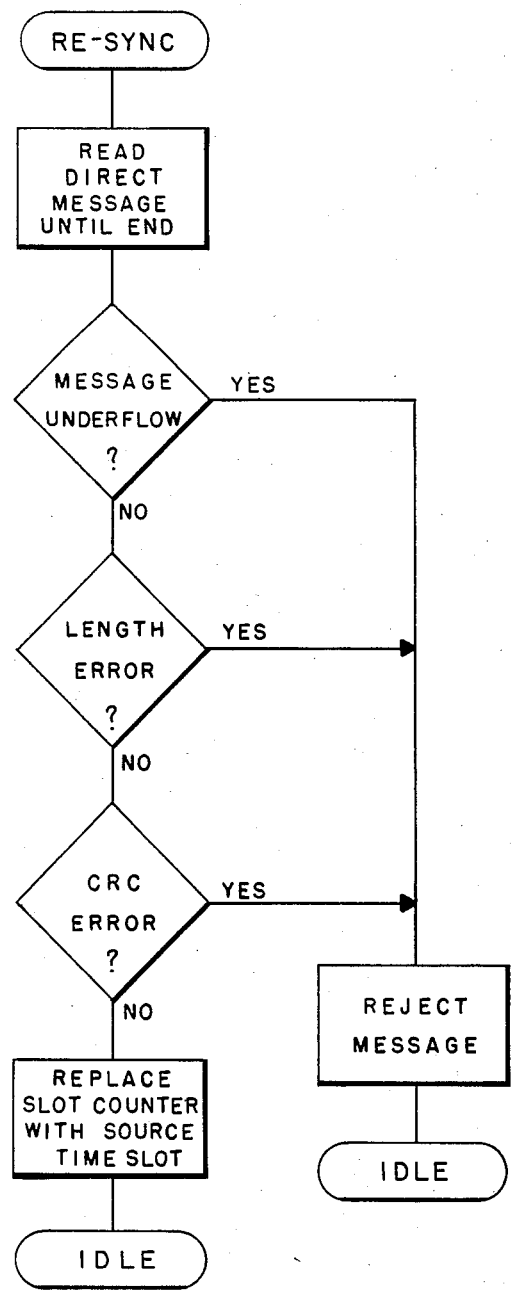
FIG. 10 shows the resynchronization operation of a station.

The resynchronization sequence is shown in FIG. 10. A station enters the resynchronization state when it detects that it is out of sync, i.e. its time slot does not agree with the transmitter's time slot as previously described. The station in this state reads the message only to determine if it should update its slot counter. If any errors are detected in the message, then the message is rejected and the station returns to the idle state. If no errors are detected, then the station updates its time slot counter with the contents of the source time slot message character and returns to the idle state.

Figure 11:
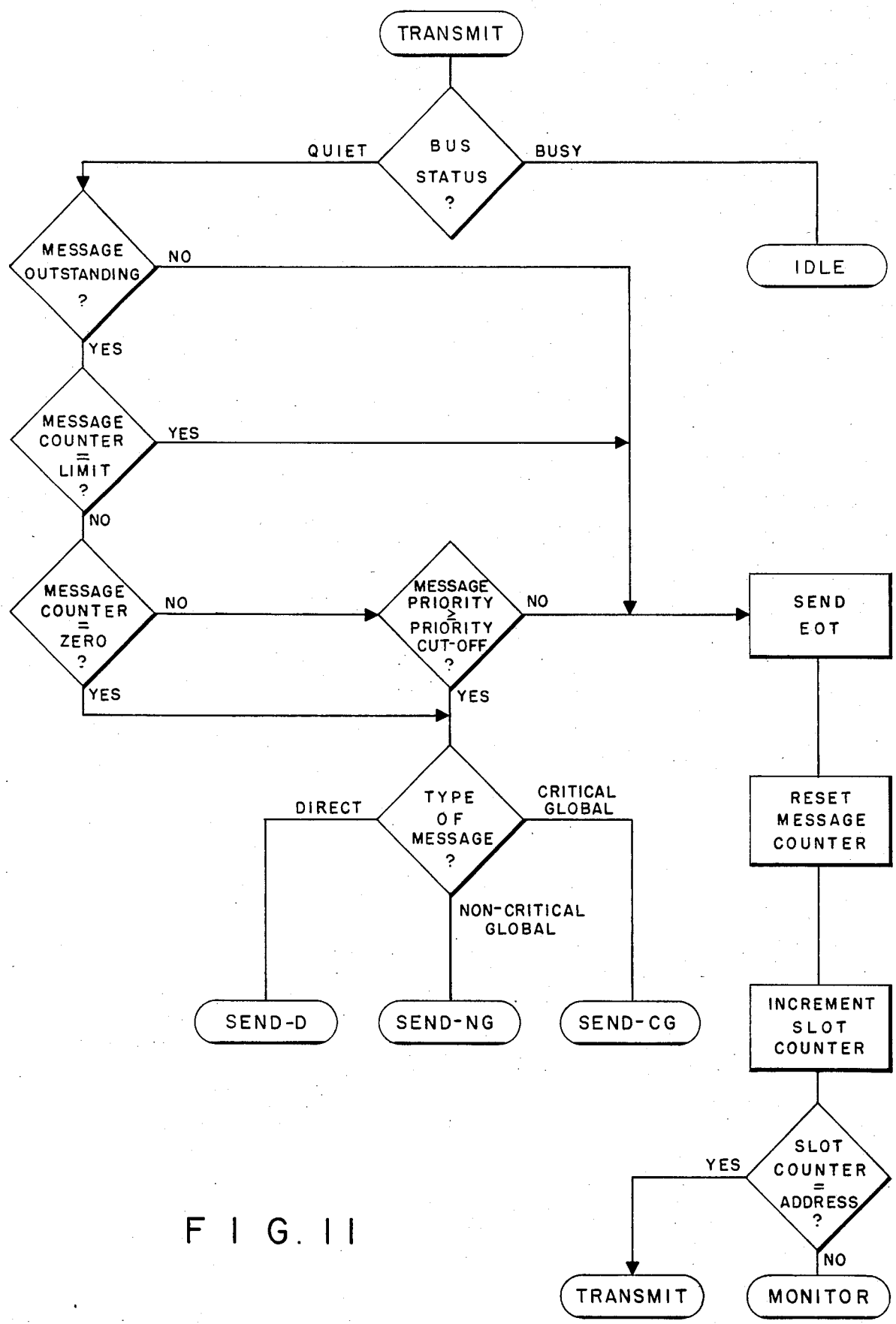
FIG. 11 shows the transmit operation of a station.

The transmit state is shown in FIG. 11. If the bus is busy, the station will return to the idle state. If the bus is quiet and if there are no messages outstanding waiting to be transmitted, the station will then transmit an end-of-transmission (EOT) control character. If there are messages outstanding, i.e. messages waiting to be transmitted but the message counter is now equal to the message limit for that time slot (i.e. the station has transmitted all of the messages for which it is allowed), an end-of-transmission control character is transmitted. If the message counter has not reached the limit and the message counter is different from zero but the next message in the priority chain has a priority less than the threshold priority, an end-of-transmission control character is transmitted. Once the end-of-transmission control character has been transmitted, the message counter is reset and the time slot counter is incremented. If the time slot counter now equals another address of this station it returns to the beginning of the transmit state; otherwise, it enters the monitor state.

If there are messages outstanding and the message counter has not reached its limit and the message counter is zero, then a message will be transmitted. This insures that the first message which a station has to transmit will be transmitted regardless of its priority. Subsequent messages, however, are transmitted only if their priority is greater than or equal to the assigned priority threshold.

Figure 12:
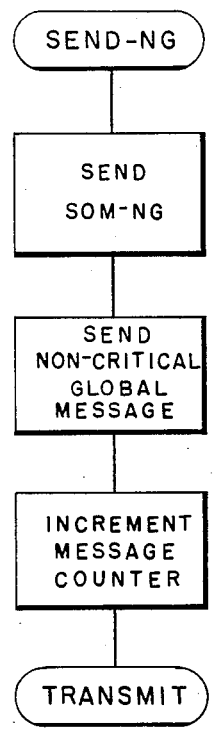
FIG. 12 shows the transmit operation of a station when it is sending a non-critical global message.

If the message to be sent is a non-critical global message (FIG. 12), then the station sends the "start of message—non-critical global" (SOM-NG) message control character, sends the message, increments the message counter and returns to the beginning of the transmit state.

Figure 13:
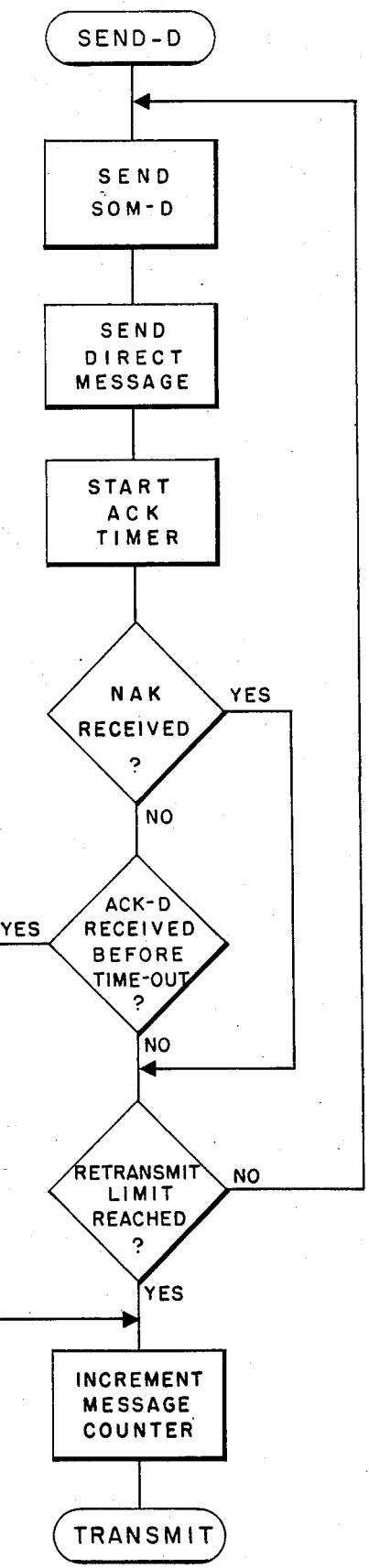
FIG. 13 shows the transmit operation of a station when it is sending a direct message.

If the message to be sent is a direct message (FIG. 13), then the "start of message—direct" (SOM-D) control character is sent, the message is sent and an acknowledgement timer is started with the acknowledge time out constant. If a negative acknowledgement (NAK) is not received but a direct acknowledgement (ACK-D) is received before the timer times out, then the timer is stopped, the station increments its message counter, and returns to the beginning of the transmit state. If a negative acknowledgement (NAK) is received or the timer times out before the direct acknowledgement (ACK-D) is received, then the station retransmits the message unless the retransmission limit for direct messages for the current value of the time slot counter for this station has been reached. If the retransmission limit has been reached, then the station increments its message counter and returns to the beginning of the transmit state.

Figure 14:
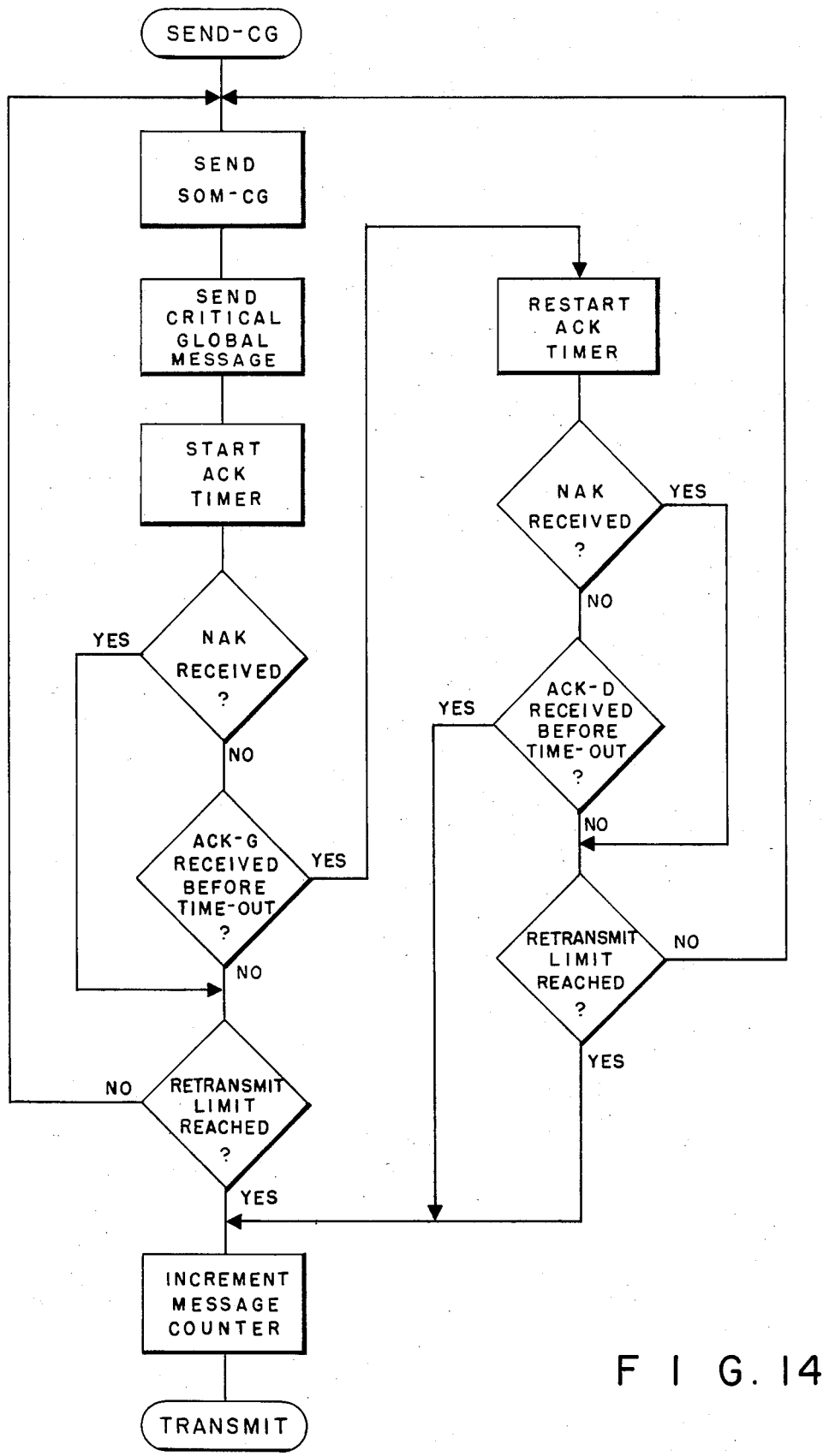
FIG. 14 shows the transmit operation of a station when it is sending a critical global message.

If the message to be transmitted is a critical global message (FIG. 14), then the station sends the "start of message-critical global" (SOM-CG) control character, sends the message and starts the acknowledgement timer with the acknowledge time out constant. If a negative acknowledgement (NAK) is received, or the timer times out before a global acknowledgement (ACK-G) is received, then the station retransmits the message unless the retransmission limit for critical global messages for the current value of the slot counter for the station has been reached. If a negative acknowledgement (NAK) message has not been received and if the global acknowledgement (ACK-G) is received before the timer times out, then the station restarts the timer with the acknowledge time out constant. If a negative acknowledgement (NAK) is received, or the timer times out before a direct acknowledgement (ACK-D) is received, then the station retransmits the message unless the retransmission limit for critical global messages for the current value of the time slot counter for the station has been reached. If a negative acknowledgement (NAK) message has not been received and if a direct acknowledgement (ACK-D) is received before the timer times out, then the message has been acknowledged successfully. The timer is stopped the station increments its message counter, and returns to the beginning of the transmit state. If the retransmission limit has been reached, the station will increment its message counter and return to the beginning of the transmit state.

Each station and have a different message limit and priority threshold. For stations with multiple addresses, each time slot can have a different message limit and priority threshold. Each station can have a different retransmission limit for each message type. For multiple address stations, each time slot can have a different retransmission limit for each message type. Any type of appropriate action can be taken if a message cannot be sent successfully because the retransmission limit is reached.

Figure 15:
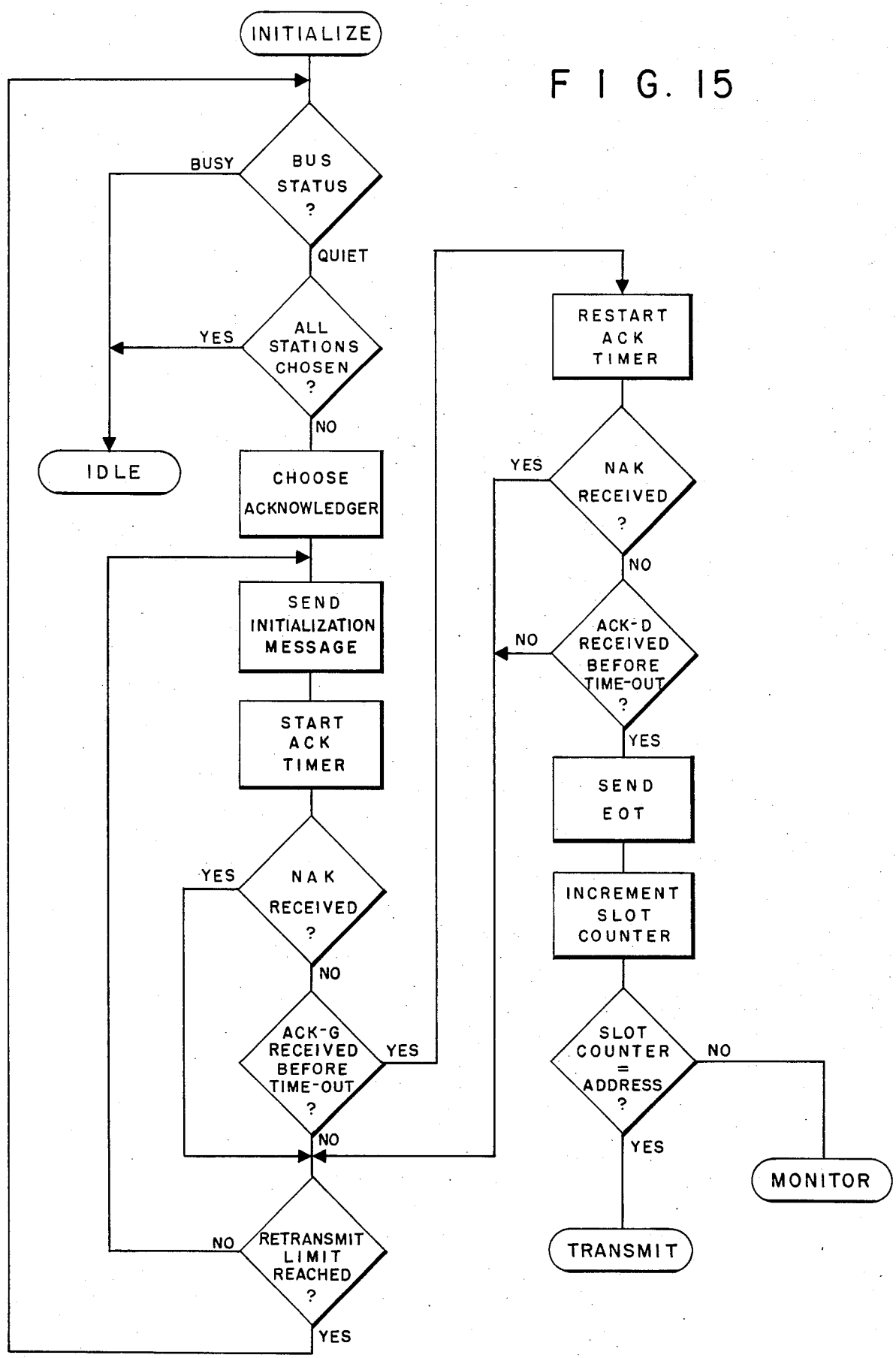
FIG. 15 shows the initializing sequence of a station when it attempts to reinitialize the communication system; and, FIG. 16 shows the quiesce operation of a station.

In the initialization state as shown in FIG. 15, the station attempts to reinitialize communication on the bus. Each station on the bus can have the capability of the reinitializing function. Each station will have an initialization timer with a different initialization time constant to insure that not two stations attempt to initialize the bus at the same time. That station whose initialization timer times out first will check that the bus is quiet. The bus will be busy if another station is attempting to initialize the bus. If the bus is quiet, the station chooses an acknowledger. This choice can be made in any number of ways. For example, the station may store a list of other stations on the bus and may sequentially go through the list choosing an acknowledger and attempting to establish communication. If all stations have been chosen the station will then enter the idle state and allow another station on the bus to attempt to initialize the bus. However, if all stations have not been chosen, an acknowledger is chosen and the initialization message is transmitted. The initialization message is constructed according to FIGS. 3–6. This message contains a control character which for an initialization message is a start of message—critical global message control character (SOM-CG), a destination address containing the address of the station assigned to be acknowledger, source time slot which contains the value of the initializing station's time slot counter (not necessarily its address), a length character which is zero since a network message will not be present, and a frame checking sequence which will contain the appropriate cyclic redundancy check bit pattern.

The initialization message is then sent. The receiving stations handle it like any critical global message. If it is received with an error a negative acknowledgement (NAK) message is sent. The station whose address matches the destination address field of the message responds to the initialization message (if it is received correctly) with the ACK-G/ACK-D sequence.

The initializing station acts similarly to a station transmitting a critical global message. It starts a timer and expects to receive and ACK-G before it times out. If it receives a negative acknowledgement (NAK), or the timer times out, its retransmits the initialization message unless the retransmission limit has been reached. If it does receive the global acknowledgement (ACK-G), then it restarts the timer and expects to receives a direct acknowledgement (ACK-D) before it times out. If it receives a NAK, or the timer times out, the station retransmits the initialization message unless the retransmission limit has been reached. If it does receive the ACK-D, then the initalization message is considered acknowledged.

If a station is unable to initialize the bus, that is, it has tried every valid station as acknowledger and never received a good response, then it will return to the idle state. However, it will load the failed initialization delay constant, rather than the quiet bus time constant, into the timer. The failed initialization delay constant is substantially larger than the quiet bus time constant. If no valid control character is received before the timer times out then the station will reenter the initialization state and attempt again to initialize the bus, starting with its first choice for acknowledger. This arrangement is used so that a station with a bad receiver cannot monopolize the communication bus because it is unable to receive an acknowledgement.

When an initialization message has been sent out and acknowledged successfully, the initializing station transmits an end-of-transmission (EOT) and increments its time slot counter. If the value of its time slot counter then equals one of its addresses, the station enters the transmit state; otherwise, it enters the monitor state.

Figure 16:
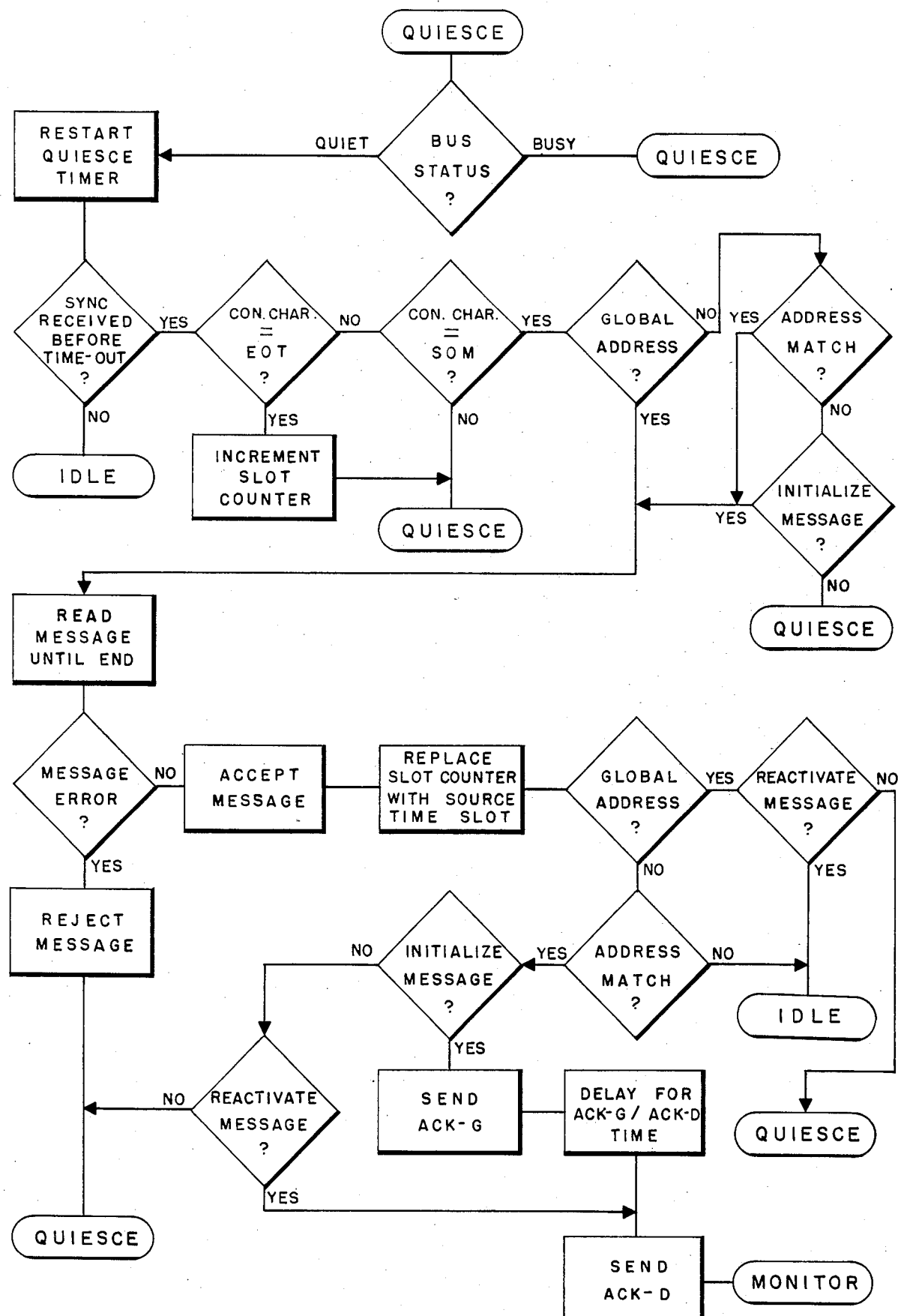

When a station is in the quiesce state as shown in FIG. 16, it is logically disconnected from the communication bus. It may receive messages and process them, but it may not transmit messages onto the bus. Generally, a station that is in the quiesce state will remain logically disconnected until is receives an initialization message or a direct reactivation message addressed to it. The quiesce state is used for diagnostic purposes.

If the bus is busy, the station remains in the quiesce state. If the bus is quiet, the station restarts the quiesce timer and if a sync pulse is not received before the timer times out, the station will enter the idle state. If the sync pulse is received before the quiesce timer times out, and if the control character of the message which is received is an end-of-transmission message, the time slot counter for that station is incremented and the station returns to the quiesce state. If the control character is not an end-of-transmission character and is not a start of message character, the station returns to the beginning of the quiesce state. If the control character is a start of message character, but the message is not a global message, and if the address does not match, and if the message is not an initialization message, the station returns to the beginning of the quiesce state. If there is an address match or if the message is an initialization message or if the message is a global message, the entire message is read. If there is a message error, the message is rejected and the station returns to the beginning of the quiesce state. If the message had been transmitted without error, the message is accepted and the source time slot is used to replace the value in the time slot counter. At this point, if the message is a global message but not a reactivation message, the station returns to the beginning of the quiesce state. If the message is a global message and is also a reactivation message or if the message is not a global message and there is no address match, the station enters the idle state. If the message is not a global message but there is an address match, and the message is an initialization message, then a global acknowledgement (ACK-G) is sent and the station waits a period of time for the ACK-G/ACK-D time constant before the ACK-D direct acknowledgement message is sent. At this point the station enters the monitor state. If the message is not an initialization message but it is a reactivation message, then a direct acknowledgement (ACK-D) message is sent and the station enters the monitor state. If it not a reactivation message, the station returns to the beginning of the quiesce state.

The embodiments of the invention in which an exclusive property or right is claimed are defined as follows:

1. A variable time division distributed bus control system for determining the order in which a plurality of stations can communicate messages over a common communicatin channel, said messages including at least a global message requiring acknowledgement by a specified station and end-of-transmission messages to inform said stations in the communication system that the transmitting station has ended transmission, said system being arranged to support the immediate acknowledgement of said global messages by said specified stations, said system comprising:

a communication medium for supporting the communication of information between a plurality of stations;

a plurality of stations connected to said communication medium;

each of said stations comprising time slot means for determining at least one time slot during which an assigned station can transmit information over said comunication medium, each time slot having only one station asigned thereto, transmission control means responsive to messages being transmitted over the communication medium and responsive to said time slot means for transmitting messages over said communication medium when it is the turn of each station to transmit, and acknowledgement timer means for delaying the transmission of any further messages for a predetermined period of time after the transmission of a global message requiring acknowledgement unless said selected station has acknowledged said global message.

2. The system of claim 1 wherein said transmission control means comprises a time slot counter which is incremented after the receipt of each end-of-transmission message.

3. The system of claim 2 wherein said transmission control means comprises means for transmitting messages having a source time slot field containing the time slot of the sending station and wherein said time slot counter is reset to the time slot contained in the source time slot field in messages which contain a source time slot field.

4. The system of claim 3 wherein said transmission control means comprises message limit memory means for storing a message limit equal to the number of messages which can be transmitted by a station during a selected time slot and a message counter for counting the number of messages sent by the station, said transmission control means terminating transmission when said message counter equals said message limit.

5. The system of claim 4 wherein said transmission control means comprises retransmission limit memory means for storing as a limit the number of times a station can retransmit a message and a retransmission counter for counting the number of times a station attempts to retransmit a message for retransmitting a message, said transmission control means retransmitting a message until the value of said retransmission counter equals said retransmission limit unless the message is acknowledged as being successfully received.

6. The system of claim 1 wherein said transmission control means comprises message limit memory means for storing a message limit equal to the number of messages which can be transmitted by a station during a selected time slot and a message counter for counting the number of messages sent by the station, said transmission control means terminating transmission when said message counter equals said message limit.

7. The system of claim 6 wherein said transmission control means comprises retransmission limit memory means for storing as a limit the number of times a station can retransmit a message and a retransmission counter for counting the number of times a station attempts to retransmit a message for retransmitting a message, said transmission control means retransmitting a message until the value of said retransmission counter equals said retransmission limit unless the message is acknowledged as being successfully received.

8. The system of claim 1 wherein said transmission control means comprises retransmission limit memory means for storing as a limit the number of times a station can retransmit a message and a retransmission counter for counting the number of times a station attempts to retransmit a message for retransmitting a message, said transmission control means retransmitting a message until the value of said retransmission counter equals said retransmission limit unless the message is acknowledged as being successfully received.

9. A variable time division distributed bus control system for determining the order in which a plurality of stations can communicate messages over a common communication channel and for reinitializing said system when communication has been quiet beyond a predetermined time period comprising:
a communication medium for supporting the communication of information between a plurality of stations;
a plurality of stations connected to said communication medium;
each of said stations comprising
time slot means for determining at least one time slot during which an assigned station can transmit information over said communication medium, each time slot having only one station assigned thereto,
transmission control means responsive to messages being transmitted over the communication medium and responsive to said time slot means for transmitting messages over said communication medium when it is the turn of each station to transmit, and
initializing means responsive when the communication medium has been quiet for a predetermined time period for initiating the transmission of an initializing message over said communication medium, said initializing message having an acknowledger portion requiring a specified station to acknowledge said initializing message, said predetermined time period being different for each station connected to said communication medium.

10. The system of claim 9 wherein said transmission control means comprises a time slot counter which is incremented after the receipt of each end-of-transmission message.

11. The system of claim 10 wherein said transmission control means comprises means for transmitting messages having a source time slot field containing the time slot of the sending station and wherein said time slot counter is reset to the time slot contained in the source time slot field in messages which contain a source time slot field.

12. The system of claim 11 wherein said transmission control means comprises message limit memory means for storing a message limit equal to the number of messages which can be transmitted by a station during a selected time slot and a message counter for counting the number of messages sent by the station, said transmission control means terminating transmission when said message counter equals said message limit.

13. The system of claim 12 wherein said initializing means comprises acknowledgement timer means for delaying the transmission of any further messages for a predetermined period of time after the transmission of an initializing message requiring acknowledgement unless said selected station has acknowledged said initializing message.

14. The system of claim 13 wherein said transmission control means comprises retransmission limit memory means for storing as a limit the number of times a station can retransmit a message and a retransmission counter for counting the number of times a station attempts to retransmit a message for retransmitting a message, said transmission control means retransmitting a message until the value of said retransmission counter equals said retransmission limit unless the message is acknowledged as being successfully received.

15. The system of claim 14 wherein said transmission control means comprises station acknowledgement selection means for selecting the acknowledger station.

16. The system of claim 9 wherein said transmission control means comprises station acknowledgement selection means for selecting the acknowledger station.

17. The system of claim 16 wherein said transmission control means comprises a time slot counter which is incremented after the receipt of each end-of-transmission message.

18. The system of claim 17 wherein said transmission control means comprises means for transmitting messages having a source time slot field containing the time slot of the sending station and wherein said time slot counter is reset to the time slot contained in the source time slot field in messages which contain a source time slot field.

19. The system of claim 18 wherein said transmission control means comprises message limit memory means for storing a message limit equal to the number of messages which can be transmitted by a station during a selected time slot and a message counter for counting the number of messages sent by the station, said transmission control means terminating transmission when said message counter equals said message limit.

20. The system of claim 9 wherein said initializing means comprises acknowledgement timer means for delaying the transmission of any further messages for a predetermined period of time after the transmission of an initializing message requiring acknowledgement unless said selected station has acknowledged said initializing message.

21. The system of claim 20 wherein said transmission control means comprises retransmission limit memory means for storing as a limit the number of times a station can retransmit a message and a retransmission counter for counting the number of times a station attempts to retransmit a message for retransmitting a message, said transmission control means retransmitting a message until the value of said retransmission counter equals said retransmission limit unless the message is acknowledged as being successfully received.

22. A variable time division distributed bus control system for determining the order in which a plurality of stations can communicate messages over a common communication channel and for allowing the transmission of plural messages during a time slot assigned to a station comprising:
  a communication medium for supporting the communication of information between a plurality of stations;
  a plurality of stations connected to said communication medium;
  each of said stations comprising
    time slot means for determining at least one time slot during which an assigned station can transmit information over said communication medium, each time slot having only one station assigned thereto,
    transmission control means responsive to messages being transmitted over the communication medium and responsive to said time slot means for transmitting messages over said communication medium when it is the turn of each station to transmit,
    message limit memory means for storing a message limit determinative of the number of messages which can be transmitted during any specified time slot assigned to the station, and
    message counter means for counting the number of messages being transmitted during a specified time slot for terminating transmission wherein the message counter reaches the message limit.

23. A station to be connected to a communication medium, said communication medium allowing the variable time division communication of messages between stations connected to the communication medium, said messages including at least global messages requiring acknowledgement and end-of-transmission messages indicating that the transmitting station has ended transmission, said station comprising:
  time slot means for determining at least a time slot during which said station can transmit messages over said communication medium; transmission control means responsive to messages being transmitted over said communication medium and responsive to the time slot means for transmitting messages over the communication medium when it is the turn of said station to transmit; and,
  acknowledgement timer means for delaying the transmission of any further messages from said station for a predetermined period of time after the transmission of a global message requiring acknowledgement unless said global message has been acknowledged.

24. A station for connection to a variable time division distributed bus control system having a communication medium for communicating messages throughout the system, the system capable of reinitializing when communication has been quiet beyond a predetermined time period, the station comprising:
  time slot means for determining at least one time slot during which said station can transmit messages over the communication medium;
  transmission control means responsive to messages being transmitted over the communication medium and responsive to the time slot means for transmitting messages over the communication medium when it is the turn of said station to transmit; and,
  initializing means responsive when the communication medium has been quiet for a predetermined period of time for initializing the transmission of an initializing message over the communication medium, the initializing message having an acknowledger portion requiring a specified station to acknowledge said initializing message, said predetermined time period being different from the predetermined time periods selected for other stations which might be connected to the communication medium.

* * * * *